United States Patent Office

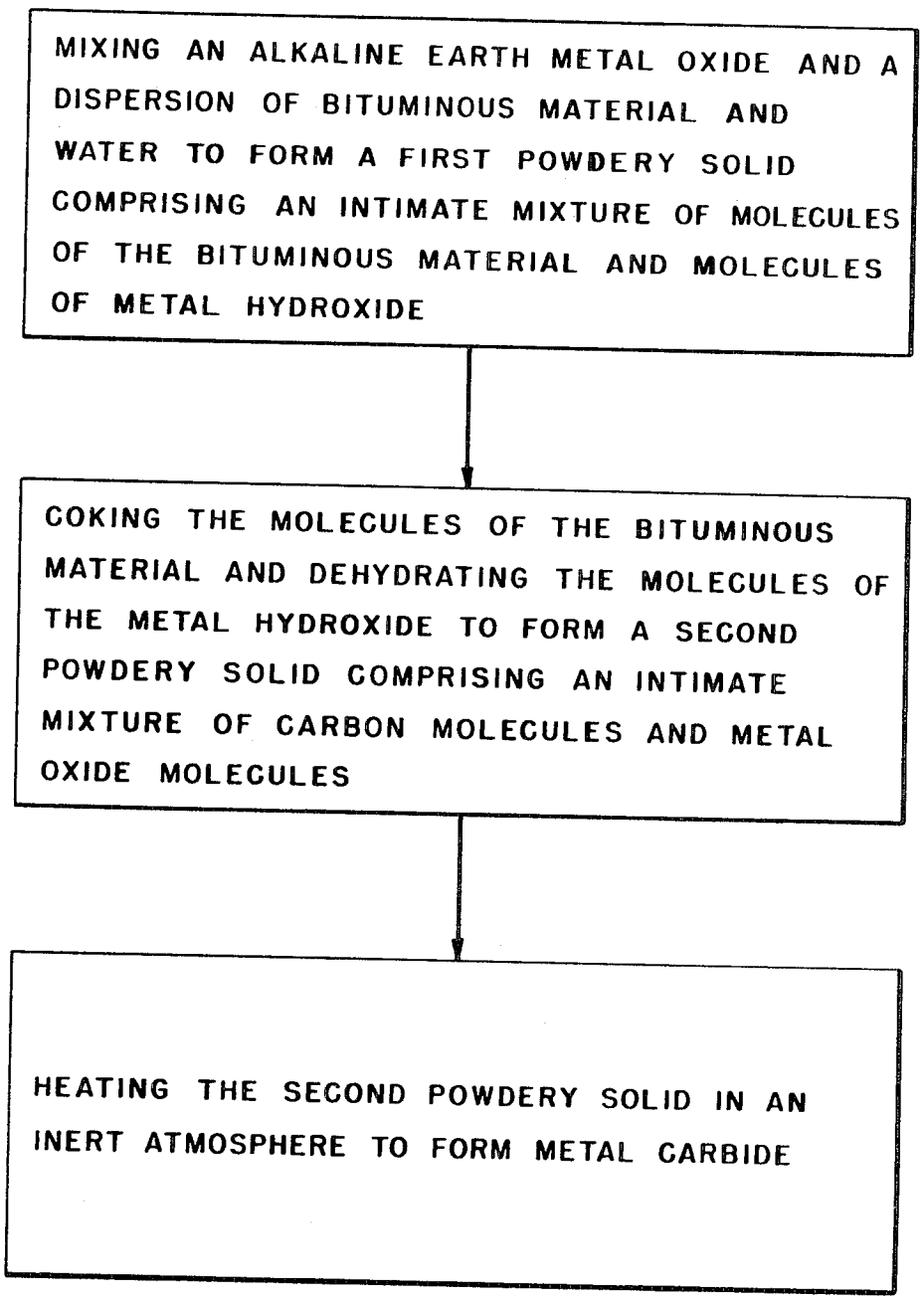

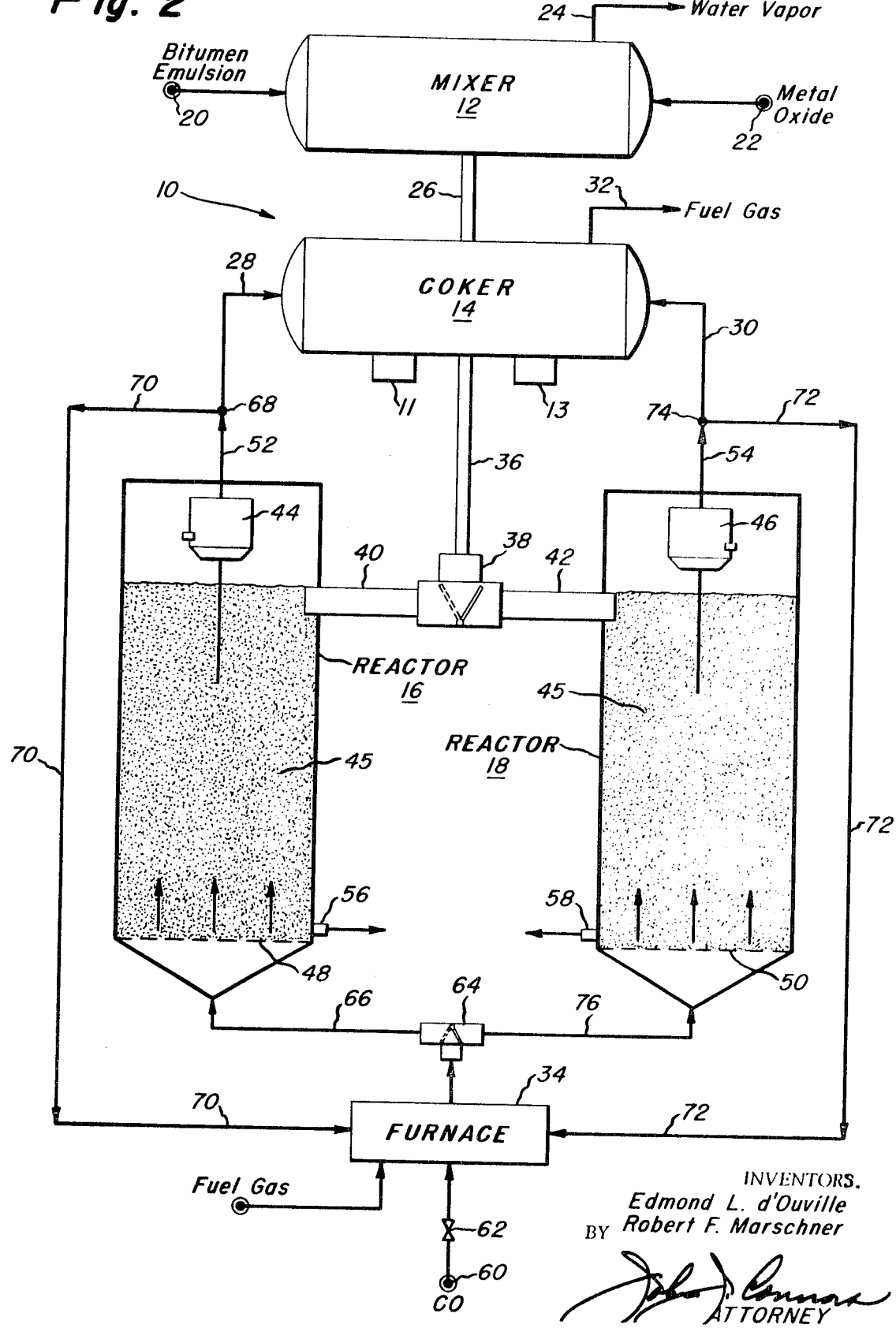

3,623,839
Patented Nov. 30, 1971

3,623,839
METHOD OF MAKING ALKALINE EARTH METAL CARBIDE
Edmond L. d'Ouville, Evergreen Park, and Robert F. Marschner, Homewood, Ill., assignors to Standard Oil Company, Chicago, Ill.
Filed Aug. 21, 1968, Ser. No. 754,365
Int. Cl. C01b *31/32;* F27b *15/00*
U.S. Cl. 23—208                                                    4 Claims

ABSTRACT OF THE DISCLOSURE

Calcium oxide is mixed with an aqueous bitumen emulsion to form a dry, powdery solid. This solid is then coked at a temperature between about 500° and 1500° C., and then heated in an inert atmosphere to a temperature between about 1500° and 1800° C. to form solid calcium carbide.

BACKGROUND OF THE INVENTION

In most conventional processes for making calcium carbide, calcium oxide and lumps of carbon are heated at temperatures ranging between 2,000° to 2,200° C. to form molten calcium carbide. U.S. Pat. No. 2,869,990 suggests mixing a bitumen with calcium oxide, subjecting the mixture to high pressure to form briquettes, and then heating the briquettes at about 1900° C. to form calcium carbide inside the interstices of the briquettes. The briquettes are made up of random mixture of carbon and calcium oxide particles, with each carbon particle containing several thousand carbon molecules, and each calcium oxide particle containing several thousand calcium oxide molecules. Calcium carbide forms only when carbon and calcium oxide molecules meet at the proper temperature condition. At a temperature of about 1900° C. some of the particles melt and carbon and calcium oxide molecules flow together throughout the interstices of the briquettes, forming inside the briquettes calcium carbide. At temperatures below 1900° C., for example between 1500° and 1800° C., the reaction proceeds slowly, if at all. This is quite understandable considering that carbon and calcium oxide particles remain in the solid state, and consequently, carbon and calcium oxide molecules only contact each other at the interface between carbon and calcium oxide particles.

BRIEF DESCRIPTION OF THE INVENTION

We have discovered a new process for making metal carbides wherein an alkaline earth metal oxide and a dispersion of bituminous material and water are mixed together to form a powdery solid, which when coked, provides an intimate mixture of carbon and metal oxide molecules. These carbon and metal oxide molecules in this intimate mixture react in the solid state at low temperatures to form solid metal carbide.

We have succeeded in forming calcium carbide at temperatures below the melting point of the calcium carbide-calcium oxide eutectic (1800° C.). This is indeed surprising, for normally calcium carbide can only be formed at temperatures exceeding 1900° C. We accomplish this unusual result by chemically forming a mixture of carbon and calcium oxide. In contrast, prior art processes call for physically forming a mixture of carbon and calcium oxide by grinding and milling techniques.

Our process has three steps. In the first step, an alkaline earth metal oxide is mixed with a dispersion of bituminous material and water. The metal oxide reacts with the water that is molecularly dispersed in the bituminous material to form a hydrophobic composite of bitumen and metal hydroxide. The metal oxide and water react exothermically, generating heat which evaporates excess water. The reaction mix may also be heated to drive off excess water. There remains after mixing a dry, powdery solid comprising an intimate mixture of molecules of the bituminous material and molecules of the metal hydroxide. The bulk of this solid contains particles ranging in size generally between about 5 and 10 microns.

In the second step, the molecules of the bituminous material are coked and the molecules of the metal hydroxide are dehydrated. Coking and dehydrating, which may be accomplished by preheating the powdery mass of bitumen-metal hydroxide solid to a temperature between about 500° and 1500° C., drives off materials which react with the metal carbide to be made. Heating dehydrogenates the bitumen and dehydrates the metal oxide to form a powdery solid which is an intimate mixture of carbon molecules and metal oxide molecules. The bulk of this powdery solid contains particles generally ranging in size between about 5 and 50 microns.

In the third step, the powdery mass of carbon-metal oxide is heated to temperatures above 1500° C. In general, we prefer to operate below the fusion point of the metal carbide-metal oxide-carbon mix because this saves the heat required for fusion of the product and the means and time required to solidify the product. If finely-divided carbide is desired, it is sufficient to heat the powdery carbon-metal oxide mix to about 1700° C. for about 30 minutes. If it is desired to increase the rate of producing the carbide, temperatures above 1800° C. may be employed.

The bituminous material employed may be a tar, pitch, asphalt, or the like. Aqueous emulsions of these materials are preferred and are well known and commercially available. We prefer using an emulsion wherein the water is the dispersed phase. The alkaline earth metal oxide may be calcium oxide, magnesium oxide, strontium oxide, or barium oxide. But, since calcium oxide is both highly reactive and the least expensive oxide available, we prefer it over the other oxides. The amount of metal oxide, the concentration of bitumen in the emulsion, and the amount of emulsion, should be properly balanced so that the ratio of carbon to metal oxide in the mass of carbon-metal oxide particles will be about 3:1. As those skilled in the art will immediately appreciate, this ratio corresponds to the stoichiometric amounts of reactants needed to form the metal carbide.

We have also invented a new apparatus for making the alkaline earth metal carbide. Briefly, this apparatus comprises a mixer, a coker, and a fluidized bed reactor. Alkaline earth metal oxide and bitumen emulsion are first mixed in the mixer to form a first powdery solid comprising an intimate mixture of bitumen molecules and molecules of metal hydroxide. The first solid is preheated in the coker to dehydrogenate the bitumen and to dehydrate the hydroxide and form a second powdery solid comprising an intimate mixture of carbon and metal oxide molecules. This second solid is then heated in the reactor to a temperature above 1500° C. but below the melting point of the metal oxide-metal carbide eutectic. During heating this second solid is maintained in a suspended state. Heating the second solid for a period of about 30 minutes is ordinarily sufficient to convert all the particles to a product containing upwards of 80% metal carbide.

We prefer to use at least two reactors which are operated asynchronously. When the carbide is being formed in one reactor, the other reactor is being filled with the second solid and vice versa. Heating the second solid, in addition to forming the carbide, also generates carbon monoxide. The carbon monoxide, which may be used as the gaseous medium for suspending the carbon-metal oxide particles, is recycled, alternately, through the reactors.

The advantages of our process and apparatus are manifold. Because the carbon-metal oxide mix is in a dry, particulate state, it will flow or can be made to flow much like liquids. Thus, material handling is greatly simplified. Because this solid is an intimate mixture between the carbon and metal oxide, carbides can be made at substantially lower temperatures than heretofore considered feasible. Consequently, reactors need not be constructed to withstand extremely high temperatures, lowering capital investment, and fuel consumption is not as great as before, reducing operating costs. Because the solid mix can be suspended in a fluidized state, uniform temperatures throughout the reaction zone are easily maintained. Thus, the quality of the metal carbide is uniform.

DESCRIPTION OF THE DRAWINGS

FIG. 1 is a flow diagram illustrating the process of our invention;

FIG. 2 is a schematic drawing illustrating the apparatus of our invention.

DESCRIPTION OF THE PREFERRED EMBODIMENTS

The process illustrated in FIG. 1 is carried out by apparatus 10 shown in FIG. 2. The principal components of apparatus 10 are: mixer 12, coker 14, and reactors 16 and 18.

Bitumen emulsion from source 20 and alkaline earth metal oxide from source 22 are brought together and mixed in mixer 12. The metal oxide and emulsion react almost instantaneously to form a dry, first powdery solid comprising a mixture of bitumen and metal hydroxide molecules. Water vapor generated during the reaction between the water of the emulsion and the metal oxide escapes through vent 24 in mixer 12. The first solid, upon being withdrawn from mixer 12, flows via conduit 26 or is otherwise conveyed to coker 14.

In coker 14, heaters 11 and 13 preheat this first solid to a temperature within the range of 500° to 1500° C. Hot carbon monoxide, generated in either reactor 16 or reactor 18, may also be fed via line 28 or line 30 into coker 14 to supply additional heat. At temperatures above 500° C., the bitumen dehydrogenates and the metal hydroxide dehydrates, forming fuel gas and a second powdery solid comprising an intimate mixture of carbon and metal oxide molecules. The bulk of this second solid is made up of particles 45 which range in size from 5 to 50 microns. The fuel gas, comprising water vapor, methane, hydrogen, etc., escapes through vent 32 in coker 14 and may be used as fuel for furnace 34. Carbon-metal oxide particles 45, upon being withdrawn from coker 14, flow through conduit 36 and are fed into either reactor 16 or reactor 18, depending on the position of valve 38. When valve 38 is in the position indicated by solid lines, the carbon-metal oxide particles 45 flow through or are otherwise conveyed via conduit 40 into reactor 16. When valve 38 is in the position indicated by dotted line, the particles move via conduit 42 into reactor 18.

Reactors 16 and 18 are of identical construction. At the top of reactors 16 and 18 are, respectively, cyclones 44 and 46, and at the bottom of these reactors are, respectively, porous screens 48 and 50. Cyclones 44 and 46 separate gases from the reacting carbon-metal oxide particles 45 contained in reactor 16 and 18 and feed the gases out, respectively, lines 52 and 54 and return the particles to the reactors. The screens 48 and 50 permit gas to flow upwardly through reactors 16 and 18, but prevent particles 45 from drifting into the bottom of the reactors. Metal carbide is withdrawn from the bottom of the reactors 16 and 18 through, respectively, outlets 56 and 58.

After mixing the emulsion and metal oxide and forming the carbon-metal oxide particles, either reactor 16 or reactor 18 is filled to capacity with particles 45. Then an initial charge of carbon monoxide or other suitable inert gas such as methane or hydrogen is fed from source 60 under the control of valves 62 and 64 into the filled reactor. When valve 62 is opened, the initial charge of carbon monoxide flows through the furnace 34 and is heated to a temperature exceeding 1500° C. but below the melting point of the carbide-metal oxide-carbon mixture. Assuming reactor 16 is initially filled, valve 64 is set as indicated in solid lines so that the hot carbon monoxide flows through line 66 into the bottom of reactor 16 and then upwardly through screen 48 to suspend carbon-metal oxide particles 45. When enough carbon monoxide has been fed into reactor 16 to establish a fluidized bed, valve 62 is closed.

As the temperature of particles 45 in reactor 16 increases, metal carbide and more carbon monoxide form. Cyclone 44 withdraws the carbon monoxide from the top of reactor 16 and feeds this hot gas to junction 68. At junction 68, some carbon monoxide is fed through line 28 into coker 14, and some is fed through line 70 to furnace 34 and is reheated and recycled.

Once the heating of particles 45 in reactor 16 begins, valve 38 is set as indicated in dotted lines so that carbon-metal oxide particles from the coker 14 are fed into reactor 18, filling this reactor up to capacity. When all the particles 45 in reactor 16 are converted to metal carbide, valve 64 is first set as indicated in dotted lines so that carbon monoxide now flows through reactor 18 rather than reactor 16. At this time, the metal carbide is withdrawn from reactor 16 via outlet 56.

Hot carbon monoxide now flows through reactor 18, and cyclone 46 separates the gas in reactor 18 from the particles 45 and feeds the gas to junction 74. At junction 74, some carbon monoxide is fed to coker 14 via line 30, and some is fed again to furnace 34 via line 72, reheated, and then recycled via valve 64 and line 76 to reactor 18. When all the particles 45 in reactor 18 are converted to metal carbide, the metal carbide is withdrawn from reactor 18 through outlet 58.

Reactor 16 is refilled with particles 45 while metal carbide is being formed in reactor 18, and likewise, reactor 18 is refilled with particles 45 while metal carbide is being formed in reactor 16. Consequently, our apparatus permits switching back and forth between reactors 16 and 18, utilizing in the most efficient manner the heat energy of the carbon monoxide.

The above has been presented merely to illustrate the preferred embodiment of our invention. Those skilled in the art will immediately see that our process and apparatus can be changed in many details which do not depart from the basic principles of our invention. For example, metal carbides other than calcium carbide may be made, alternate systems can be devised which utilize a fluidized bed, or heating could be conducted at higher temperatures to increase the rate of metal carbide production.

We claim:

1. The method of making an alkaline earth metal carbide, comprising the steps of:
   (a) mixing an alkaline earth metal oxide with an aqueous bitumen emulsion, whereby the metal oxide and water in the emulsion react exothermically to form a finely divided first solid comprising an intimate mixture of bitumen molecules and metal hydroxide molecules;
   (b) heating said first solid at a temperature between about 500 and about 1500° C., whereby the bitumen is coked and the metal hydroxide is dehydrated to form a finely divided second solid comprising an intimate mixture of carbon molecules and metal oxide molecules; and (c) heating said second solid in an inert atmosphere at a temperature between about 1500 and about 1800° C., whereby the carbon molecules and metal oxide molecules react in the solid state to form solid non-fused metal carbide.

2. The method defined in claim 1 wherein said metal oxide is calcium oxide.

3. The method defined in claim 1 wherein said second solid is suspended in the inert atmosphere during heating.

4. The method defined in claim 1 wherein said second solid contain in substantial portion particles ranging in size between about 5 to 50 microns.

References Cited

UNITED STATES PATENTS

| | | | |
|---|---|---|---|
| 3,017,244 | 1/1962 | Atwell | 23—208 X |
| 3,017,259 | 1/1962 | Eastman | 23—208 X |
| 3,044,858 | 7/1962 | Sage | 23—208 |

MILTON WEISSMAN, Primary Examiner

U.S. Cl. X.R.

23—260, 284